Oct. 31, 1967  E. R. SILVEY  3,349,645
SAW CHAIN GRINDING MACHINE
Filed Aug. 23, 1965  3 Sheets-Sheet 1
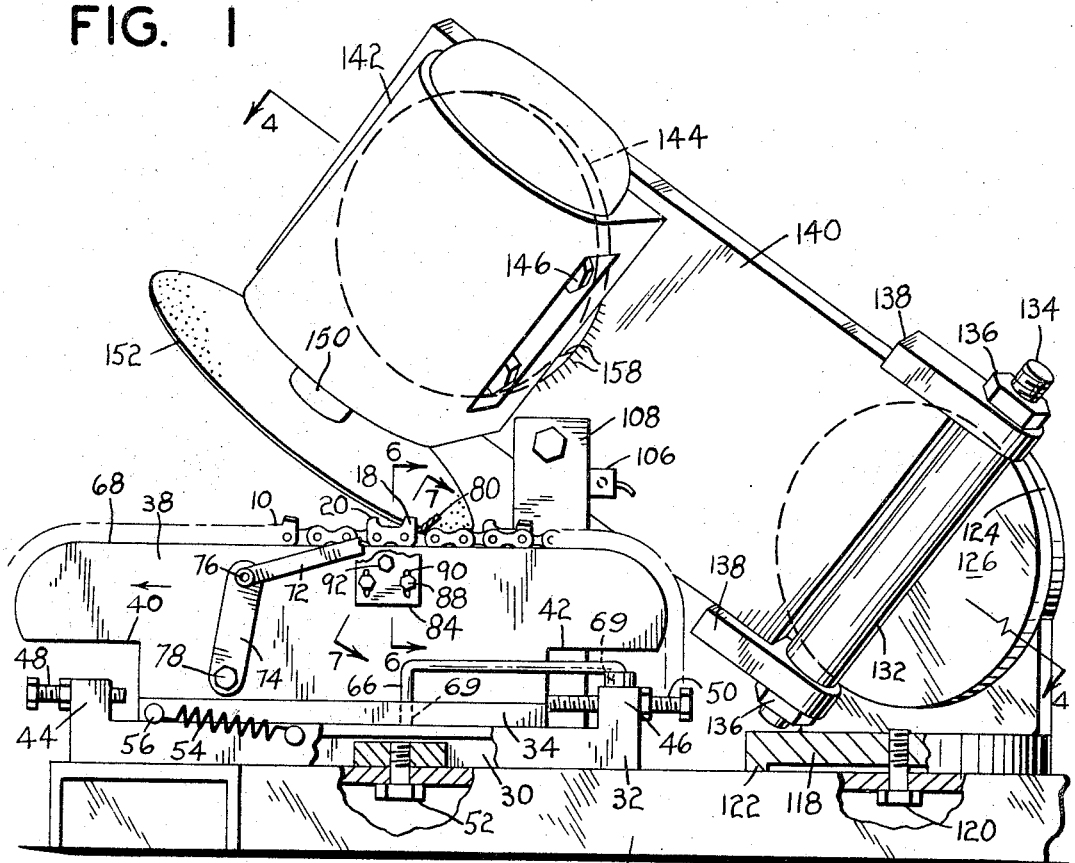
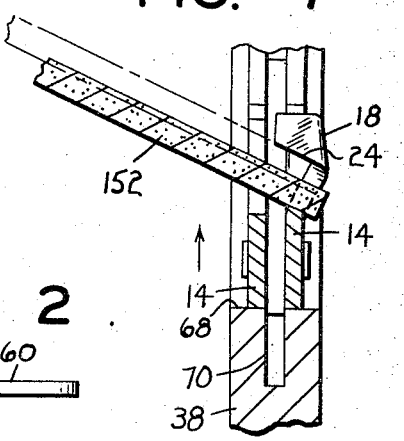
INVENTOR.
ELMER R. SILVEY
BY Eugene M. Eckelman
ATTORNEY

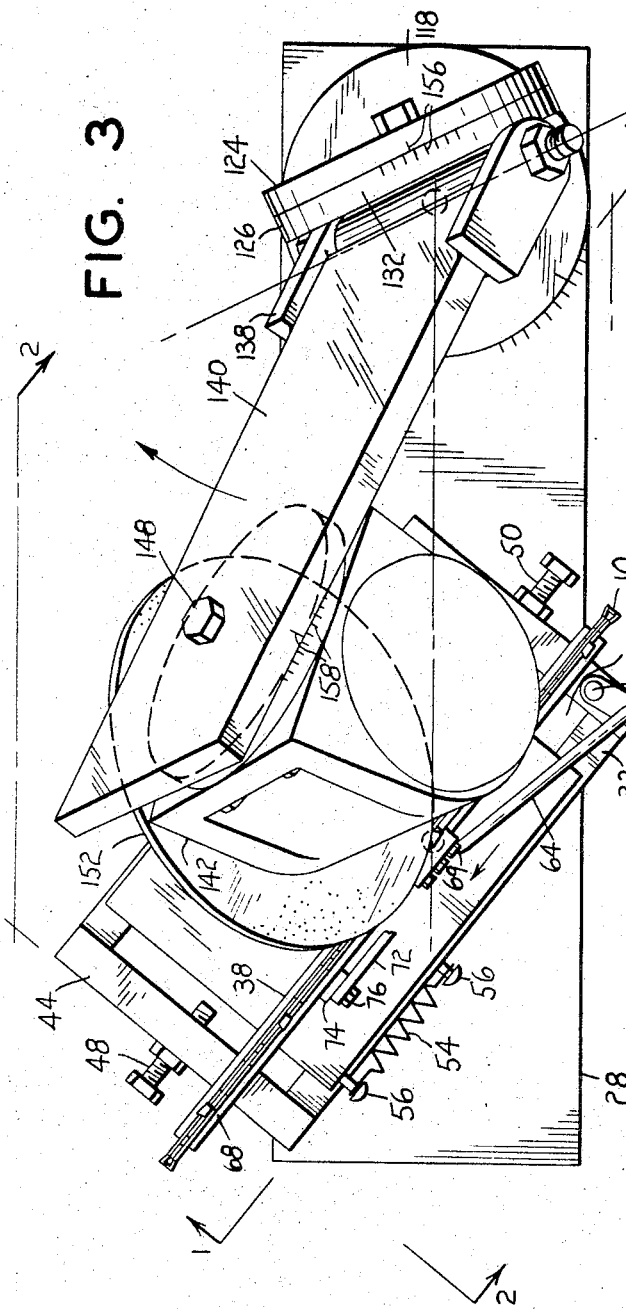

Oct. 31, 1967  E. R. SILVEY  3,349,645
SAW CHAIN GRINDING MACHINE
Filed Aug. 23, 1965  3 Sheets-Sheet 3

INVENTOR.
ELMER R. SILVEY
BY Eugene M. Eckelman
ATTORNEY

United States Patent Office 3,349,645
Patented Oct. 31, 1967

3,349,645
SAW CHAIN GRINDING MACHINE
Elmer R. Silvey, Medford, Oreg., assignor to Katherine A. Silvey, Medford, Oreg.
Filed Aug. 23, 1965, Ser. No. 481,735
14 Claims. (Cl. 76—40)

ABSTRACT OF THE DISCLOSURE

A grinding wheel for sharpening a saw chain is mounted on the shaft of a motor. The motor is adjustably carried by one end of an arm, the other end of which is pivotally mounted on a member secured to the base of the saw chain grinding machine and adjustable relative to such base about two axes at right angles to each other. A saw chain carriage having a elongated bar for supporting a saw chain is adjustably mounted on the base of the machine. The positions of the arm and bar can be adjusted so that pivotal movement of the arm will move the peripheral edge of the grinding wheel into the space between the depth gauge and cutter element of a cutter link of a saw chain supported on the bar in proper alignment for grinding bevel surfaces on the cutter element to sharpen cutting edges thereon. The carriage is movable generally longitudinally of the chain to bring such surfaces into contact with grinding surfaces on the wheel. The bar is provided with a groove into which a portion of saw chain extends and is also provided with a hold down device which holds the cutter link having the cutter element thereon to be sharpened against the bar and against a stabilizing block at one side of the bar. The hold down device is moved to hold down position when the grinding wheel is moved to cause the peripheral edge of the grinding wheel to move into the gap between the depth gauge and cutter element referred to above and is released when the grinding wheel is retracted. A latch finger rides over the depth gauge and cutter element on a cutter link when the hold down device is released and the next cutter link is moved to grinding position by forward movement of the chain along the bar. The latch finger drops behind such cutter link to hold it from rearward movement during the grinding operation.

Description

This invention relates to grinding machines and more particularly comprises a power driven grinding machine for sharpening saw chains.

An object of the present invention is to provide a grinding machine for saw chains having a novel arrangement of grinder and of saw chain holding means wherein a saw chain in supported position on a carriage is moved into the grinder.

Another object is to provide a saw chain grinding machine which employs a grinder and saw chain holding means, the latter employing novel hold-down means for anchoring a portion of the saw chain securely for efficient grinding engagement with a grinder, and more particularly to employ a hold-down means comprising first a lever capable of temporarily securing a cutter link of the chain against vertical movement during grinding of a cutter element on such link; second, a stabilizing block on the other side of the chain with relation to said lever for stabilizing the cutter link against lateral forces imparted to it by the grinder; and, third, latch means to hold the cutter link against retracting movement with relation to longitudinal forces imparted to it by said grinder.

Another object of the invention is to provide a saw chain grinding machine in which a first relative movement between a grinding wheel and a saw chain is employed to position the peripheral edge of a grinding wheel within the space between the cutter element and depth gauge of a cutter link of a saw chain with such edge out of contact with the cutter element and a second relative movement between the grinding wheel and saw chain is employed to engage surfaces of the grinding wheel flatwise with beveled surfaces on such cutter link to sharpen such cutter element.

Another object is to provide a saw chain grinding machine which utilizes a movable carriage on which a saw chain may be anchored and which is movable to carry a cutter element of the saw chain into a grinder, and including adjustable stop means for controlling the travel of the cutter element into the grinder.

Still another object is to provide a saw chain grinding machine having a hold-down means for a cutter link of a saw chain and control means for such hold-down means operated by the grinder, whereby when the grinder moves toward a grinding position, control means are operated thereby for actuating the hold-down means for the saw chain.

Another object is to provide a saw chain grinding machine having a grinder and adjustment means associated therewith for positioning the grinder at selected angles relative to a saw chain cutter element.

Additional objects will become apparent from the following specification and claims, considered together with the accompanying drawings, wherein the numerals of reference indicate like parts.

In the drawings:

FIGURE 1 is a front elevational view, partly in section and with parts broken away, of a saw chain grinding machine embodying the principles of the present invention, this view being taken on the line 1—1 of FIGURE 3;

FIGURE 2 is an offset view taken on the line 2—2 of FIGURE 3 and also being partly broken away;

FIGURE 3 is a top plan view of the grinding machine;

FIGURE 7 is an enlarged, fragmentary, sectional view taken on the line 7—7 of FIGURE 1;

FIGURE 8 is an enlarged, fragmentary plan view taken on the line 8—8 of FIGURE 2.

Figure 4:
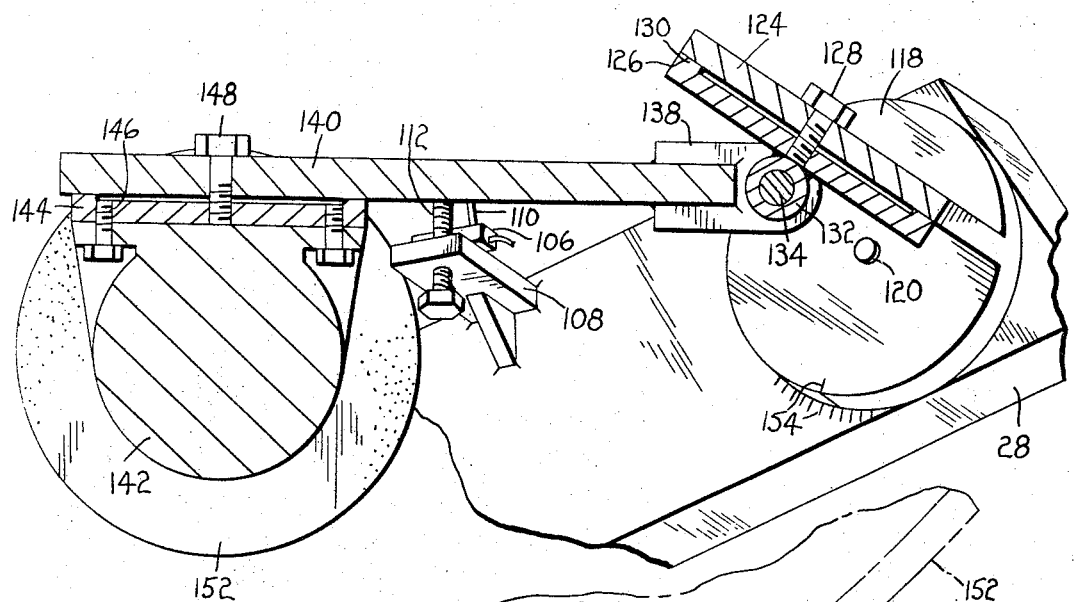
FIGURE 4 is a sectional view taken on the line 4—4 of FIGURE 1.

The present grinding machine is designed to sharpen the cutter elements of saw chains 10, FIGURES 1, 2 and 5–8. Such saw chains comprise a plurality of links 12 joined by side plates 14. Links 12 have inwardly extending projections 16 which as is well known serve to guide the saw chain around a saw bar on the power unit. Alternate pairs of the side plates 14 include cutter links having cutter elements 18 and depth gauges 20. The type of cutter element shown, which is known in the art as a chisel-type cutter element, is provided with L-shaped or angular front beveled surfaces 22, FIGURES 5 and 6. As apparent in FIGURE 8, the leading outer cutting edge 24 is adjacent a surface 22 which is beveled laterally. The alternate cutter elements on the saw chain face in opposite directions, the present grinding machine being capable of sharpening the cutter elements facing in one direction. The cutter elements facing in the other direction are sharpened by a machine similar in structure but reversed in its direction of sharpening operation.

Referring now in particular to FIGURES 1–4, the machine of the present invention includes a base 28 which for purposes of illustration may comprise an inverted channel-type member. Seated on the base 28 is a bed plate 30 having integral side rails or projections 32 which form guides for a longitudinally slidable carriage 34 having side grooves 36 which engage the rails 32 for guided movement. Projecting vertically upwardly from the carriage 34 is a bar or plate 38 which as apparent in FIGURE 1 has notches 40 and 42 at its ends. The forward and rearward ends of the bed plate 30 are provided with upward projections or end walls 44 and 46, respectively, and these projections have horizontally disposed adjustable abutment screws 48 and 50, respectively, threadedly mounted therein. The inner ends of these abutment screws are adapted for engagement by the carriage 34 to limit sliding movement thereof in a longitudinal direction, as will be more apparent hereinafter.

The bed plate 30 is secured to the base 28 by means of a single fastening screw 52 passing freely upwardly through a suitable bore in the base 28 and threadedly engaged with the bed plate 30. By loosening the screw 52, the bed plate can be rotatably adjusted relative to the base, and by tightening the screw the bed plate can be secured in a fixed position relative to the base. As will be seen hereinafter, rotative positioning of the bed plate is desirable in locating the plate or bar 38 on the carriage 34 in a selected direction.

A tension spring 54 is connected between the carriage 34 and the base plate 30 and urges the carriage to the right or in other words in a position in engagement with abutment screw 50. The spring 54 is connected to the carriage and the bed plate by suitable pins 56.

With particular reference to FIGURES 1, 2 and 3, the carriage is adapted to be moved to the left in FIG. 1, namely, toward abutment screw 48, by any suitable means such as a manually operable hand lever 60 pivotally mounted at one of its ends, by means of a pivot pin 62, on the end projection 46 of the bed plate 30. Pivotally connected to the lever 60 intermediate its ends is one end of a link 64 the opposite end of which is pivotally connected to the carriage 34. The pivotal connection of the link 64 with the lever 60 and the carriage 34 may be accomplished by the reception of suitable angular end portions 66 on the link in apertures 69 in said lever and carriage. It is apparent that by rotation of the hand lever 60 in a clockwise direction as viewed in FIGURE 3 the carriage 34 will be urged to the left toward abutment screw 48, and that upon release of the hand lever the carriage will be returned to its right hand position in abutment with the screw 50 by means of the spring 54.

Figure 6:
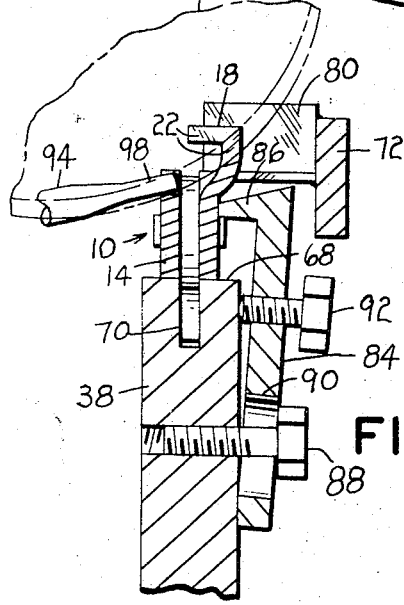
FIGURE 6 is an enlarged, fragmentary, sectional view taken on the line 6—6 of FIGURE 1.

The upright bar 38 on the carriage 34 has means for receiving a saw chain and furthermore is associated with means for securely holding a portion of the saw chain in a fixed position for sharpening. For receiving a saw chain, and as best seen in FIGURES 6 and 7, the top edge 68 of the bar 38 has a longitudinal groove 70 for receiving the inward projections 16 which ordinarily engage the peripheral edge groove in a chain saw bar. Thus, when the saw chain is to be sharpened it is first draped over the top of bar 38 with the projections 16 of the saw chain inserted in the groove 70. The groove 70 preferably also extends down along the ends of the bar 38.

Although the groove 70 is arranged to hold the chain in a somewhat stable position, it is also desired, as stated above, to utilize hold-down means for the chain to anchor at least a portion of the latter in a fixed position for grinding. One of such holding means comprises a latch finger 72, FIGURES 2, 5 and 6, which is arranged to catch behind a cutter link having a cutter element to be sharpened and anchor the cutter link against retracting or rearward movement. Latch finger 72 is pivotally attached to the upper end of a link 74, as by means of a pivot pin 76, and the link 74 is secured at its lower end to the bar 38 by means of a fastening screw 78. The screw 78 upon selected loosening and tightening thereof permits rotative adjustment of the link 74 for selective positioning of the latch finger 72.

Latch finger 72 is of sufficient length and capable of being adjusted with its supporting link to extend along one side of the chain, and has an angled latch plate 80 secured transversely thereto. This latch plate is selectively angled such that when the saw chain 10 is moved to the left, as viewed in FIGURE 1 or to the right as viewed in FIGURE 5, said plate will ride over the depth gauge and cutter element of a cutter link and the forward edge of said plate will catch behind the cutter link and anchor the chain positively against retracting movement.

Second holding means are provided for the chain, such second holding means comprising a stabilizing plate or anvil 84 having an angular tongue portion 86 at its upper end directed inwardly toward the chain and arranged to engage one side of the cutter link carrying the cutter element 18 being ground. The plate 84 is secured to the chain supporting bar 38 by a pair of screws 88 passing freely through vertically elongated slots 90 in the lower portion of the plate 84 and threadedly engaged in the bar 38. Located upwardly in the plate 84 and threadedly engaged in a suitable tapped bore therein is a screw 92 the inner end of which abuts freely against a side surface of the bar 38. By means of the screws 88 and 92 the plate 82 is adapted to be secured in a vertically adjusted position and yet can be angularly disposed with relation to the bar 38 for the purpose of positioning the abutting tongue portion 86 selectively for proper engagement and backing support for a cutter link of the saw chain while the cutter element 18 thereon is being ground.

Figure 5:
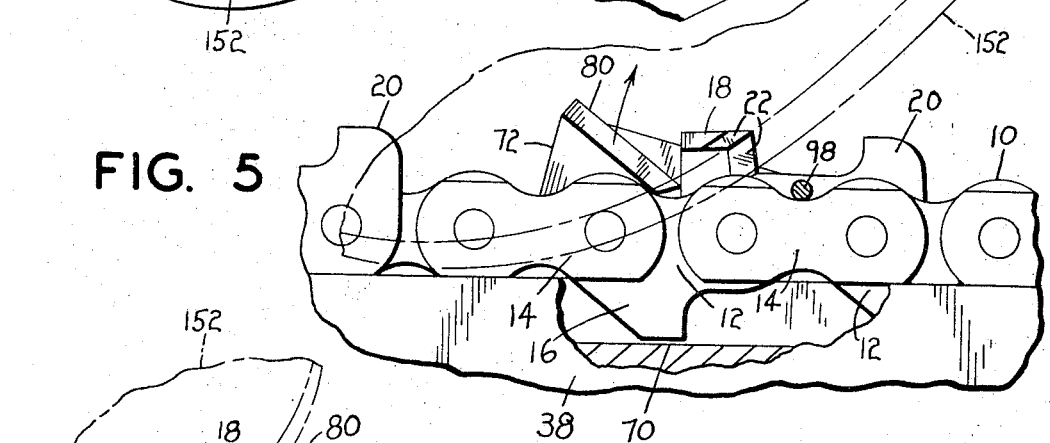
FIGURE 5 is an enlarged, fragmentary, sectional view taken on the line 5—5 of FIGURE 2.

With particular reference now to FIGURES 2, 5 and 6,, third holding means are provided which serve to hold the saw chain firmly downwardly against the top grooved portion of the bar 38. Such third holding means comprises a lever 94 pivotally mounted intermediate its ends on an upright standard 96 integrated with the carriage 34. The lever 94 has a tip end 98 which is arranged to seat on the top edge of a side plate 14 of the saw chain opposite the cutter link during grinding of the cutter element on such cutter link, an engaging and holding position of such tip end of the lever being illustrated in FIGURE 5. A tension spring 100 is connected between the lever 94 and the carriage forwardly of the standard 96 whereby normally to urge the tip end of the lever into engagement with a side plate of the chain as just described.

It is desired that the spring 100 have sufficient spring force to hold the chain securely down on the bar, and furthermore since the pivot joints of saw chains to be sharpened sometimes are relatively stiff, it is desired that the spring have sufficient force to straighten the chain and hold it against the top of the bar.

The opposite end of the lever 94 from its tip end is pivotally connected to the plunger 102 of a solenoid 104, the power stroke of the plunger 102 being downwardly as viewed in FIGURE 2 whereby when the solenoid is energized the plunger is moved downwardly to raise the tip end of the lever 94. When the circuit to the solenoid is open the spring 100 is free to pull the tip end of the lever downwardly into engagement with the saw chain.

Figure 9:
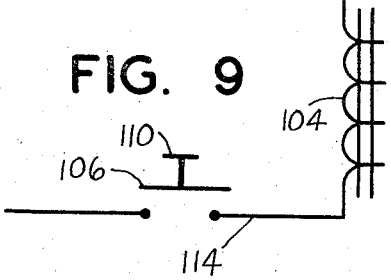
FIGURE 9 is a wiring diagram of electrical hold-down operating means embodied in the present structure.

With particular reference to FIGURES 1, 2 and 4, a solenoid control switch 106 is in the electrical circuit to the solenoid and this switch is mounted on an upright post or standard 108 integrated with the base 28. Switch 106 is a plunger-type switch and its plunger 110, FIGURE 4, serves to operate the switch 106 for a purpose to be described hereinafter. Threadedly mounted in the post 108 is an abutment screw 112 also having a purpose to be described hereinafter. FIGURE 9 is a wiring diagram of the solenoid 104 and the solenoid control switch 106. In this latter view the numerals 114 designate lead wires to the solenoid, the switch 106 being connected in one of the lead wires for accomplishing the aforesaid control of the solenoid.

As apparent in the drawings and best seen in FIGURE 2, the latch finger 72 and stabilizing plate 84 are disposed on the front side of the bar 38 and the lever 94 is disposed on the back side.

Mounted on one end of the base 28, and more particularly the right hand end in FIGURE 1 or that end adjacent the abutment screw 50, is a turntable 118. Turntable 118 is attached to the base 28 by means of a single mounting screw 120 projecting freely upwardly through a suitable bore in the base 28 and threadedly engaged in said turntable. The screw 120 centrally engages the turntable 118 and is arranged upon loosening thereof to permit rotative adjustment of the turntable. When tightened, the screw 120 secures the turntable fixedly on the base in non-rotative position. To provide a good frictional connection between the turntable and the base, said turntable has a downwardly extending peripheral flange portion 122.

Forming an integral part of the turntable 118 is an upright standard 124, and as seen in FIGURE 4, a disclike support plate 126 is mounted on the standard 124 by a single mounting screw 128 which passes freely through the arm 124 and threadedly engages the plate 126. Similar to the mounting arrangement between the turntable 118 and the base 28, the screw 128 has central engagement with the plate 126 and may either be tightened to secure the plate on the arm in non-rotative position or may be loosened to permit rotative adjustment. Plate 126 has a peripheral flange portion 130 engageable with the arm 124.

Integrated with the plate 126, such as by welding, is a sleeve 132 for receiving a shaft 134 of a length to project beyond the sleeve ends. Shaft 134 has threaded end portions for receiving nuts 136. Mounted rotatably on the projecting ends of the shaft, are a pair of yoketype mounting blocks 138 to which is integrated a support arm 140 for an electric motor 142. The arm 140 has free swinging movement through a portion of a circle on the shaft 134.

Motor 142 is integrated with a mounting plate 144, FIGURES 3 and 4, such as by screws 146, and the mounting plate 144 is attached to the arm 140 adjacent the free end of the latter by means of a single attaching screw 148 which passes freely through the arm 140 and is threadedly engaged with a suitable bore provided centrally in the mounting plate 144. As in the turntable 118 and the support plate 126 for the arm 140, the motor mounting plate 144 may be rotatably adjusted relative to the arm 140 but secured in a non-rotative position on the arm by tightening the screw 148.

The shaft 150 of the motor has a pre-shaped grinding wheel 152 thereon, and for the purpose of the present invention, such grinding wheel is of thin construction and more particularly has a thickness substantially equal to the height of the vertical portion of the angular cutting face 22 of the saw tooth 18. The wheel may be preshaped such that its peripheral edge is disposed at right angles with relation to the surface of said wheel or said edge may extend at angles other than at right angles, depending upon the angular relation of the cutting faces 22 of the teeth 18. At any rate one edge of the wheel must be kept relatively sharp in order to cut the corner in the cutter element between the beveled surfaces 22.

It is apparent that by means of the turntable 118 the entire motor supporting assembly can be rotatably adjusted on a vertical axis relative to the base 28, the arm 140 can be adjusted on a horizontal axis by rotatably positioning the support plate 126 relative to the upright standard 124, and the motor can be rotatably adjusted relative to the arm 140. As stated, the arm 140, together with the motor, is free to swing at all times on the shaft 134, this latter movement comprising a movement of the grinding wheel from a retracted position, namely a position in which the arm 140 is moved away from the viewer in FIGURE 1, and a grinding position wherein the arm 140 swings by gravity toward the viewer in engagement with the abutment screw 112. The latter position, comprising engagement of arm 140 against the abutment screw 112, comprises a grinding position of the grinding wheel 152.

It will be apparent from FIGURE 1 that the movement of the grinding wheel to the grinding position moves the peripheral edge of the grinding wheel relative to the saw chain into the space between the cutter element 18 and the depth gauge 20 of the cutter link which is in position to have its cutter element sharpened. As described below, this movement of the grinding wheel does not cause the peripheral edge of the grinding wheel to engage the cutter element so that such edge is maintained out of contact with the beveled surfaces 22 of the cutter element until subsequent movement of the carriage 34 moves the saw chain relative to the grinding wheel to bring these beveled surfaces of the cutter element into contact with the peripheral edge of the grinding wheel.

Also, by means of the motor support described, the arm 140 and the motor 142 are disposed behind the bar 38 and the grinding wheel 152 is disposed obliquely with relation to the carriage 34. Such oblique positioning of the grinding wheel 152 serves to grind both beveled surfaces 22 of a cutter element 18 in that the outer surface of the grinding wheel is positioned to grind the vertical beveled surface of the cutter element and is inclined relative to the horizontal so that a side surface of the wheel is positioned to grind the upper beveled surface 22.

To accomplish the desired settings of the grinding wheel, as determined by the angular relation of the cutting faces, it is only necessary to sutably adjust the turntable 118, the support plate 126, and the motor mounting plate 144. By suitable adjustment of one or by a combined adjustment of all three of these elements, desired angular relationships with relation to the horizontal and vertical can be readily set. In order to accomplish the selected settings, calibrations 154 may be provided on the turntable 118 and on the base 128, FIGURE 4, calibrations 156 may be provided on the support plate 126 and the upright standard 124, FIGURE 3, and calibrations 158 may be provided on the motor mounting plate 144 and arm 140, FIGURE 3.

As stated hereinbefore, the cutter elements of the saw chain cutter links have beveled surfaces providing a cutting edge 24, FIGURES 7 and 8, and such edge is provided on the cutter element in a grinding operation by selected rotative positioning of the bed plate 30 relative to the base 28. Thus, by loosening the fastening screw 52 the bed plate 30 and of course the carriage 34 are rotatably adjusted as a unit relative to the base 28. With the chain held in a selected angular position across the base the desired angle of edge 24 is provided.

As apparent in FIGURES 1 and 2, the saw chain is held on the bar in a grinding position such that the vertical cutting face 22 of the cutter element to be sharpened is substantially vertically aligned with the axis of screw 52, thus permitting rotative adjustment of the chain with its supporting means without altering lateral or longitudinal displacement of the cutter element.

*Operation*

In the operation of the present grinding machine it is desired that the motor 142 may be moved to its retracted position, namely, that limit position away from the viewer in FIGURE 1. Movement of such motor, and its support arm 140, off the abutment screw 112 causes disengagement of the arm 140 from the switch plunger 110. This closes the switch 106 whereby to cause an energization of the solenoid 104, and the solenoid then operates on the holding lever 94 to raise the tip end 98 of the latter. A chain 10 is then installed on the upright carriage bar 38 with the projections 16 thereof disposed in the groove 70 of the bar 38. The chain is moved forwardly to a point where the angled latch plate 80 has ridden over the top of a cutter element and has engaged a trailing edge of a cutter link carrying such cutter element. The chain is thus anchored positively against any retracting movement. In the grinding operation, it is assumed that the stabilizing plate 84 has been suitably adjusted to engage a surface of the cutter link carrying the cutter element being ground and hold it against any lateral or sideways movement on the side opposite that side engaged by the grinder. It is further assumed that the bed plate 30 has been adjusted to the selected angular position on the base 28 and that the various adjusting means comprising turntable 118, plate 126 and plate 144, have been selectively adjusted.

With the saw chain positioned on the bar 38 as thus far described, the motor 142 may be swung forwardly to bring the peripheral edge of the grinding wheel into grinding position.

As the support arm 140 comes into abutment with abutment screw 112 it hits the plunger 110 of the switch 106 to open the switch and thus cause deenergization of the solenoid 104. This permits the spring 100 to pull down the tip end 98 of the lever 94 into engagement with a top edge of a side plate 14 of the saw chain as shown in FIGURES 2 and 5. As stated hereinbefore, the force of the spring 100 is such as to cause the chain to lie completely flat on the bar 38.

It is thus apparent that the cutter link carrying the cutter element to be ground is anchored against any retractive movement by the latch finger 72 and its latch plate 80, the cutter link is anchored against any lateral horizontal movement by the stabilizing plate 84, and the cutter link is held down by the holding lever 94. In the arrangement of the holding means, and in the forward or grinding position of the grinding wheel 152, the cutter element is not as yet in engagement with said grinding wheel. To accomplish a grinding step, the operator moves the carriage 34 to the left, FIGURE 1, whereby the grinding wheel is engaged by the cutter element to grind simultaneously the two cutting faces 22 of the tooth. Movement of the carriage 34 is accomplished by rotating the hand lever 60 in a clockwise direction as viewed in FIGURE 3. The parts are so arranged, including a selected setting of the abutment screw 48, that when the carriage is stopped by the abutment screw 48 the cutter element has advanced a selected distance into the grinding wheel. As soon as the hand lever 60 is released, the spring 54 returns the carriage to its normal position in abutment with screw 50.

To grind the next cutter element, the motor support arm is swung to a retracted position which as apparent allows the switch 106 to close and cause energization of the solenoid 104. This lifts the tip end of lever 94 away from the saw chain whereby the latter can then be moved along the bar 38 to a position for grinding the next cutter element.

According to the present invention, a more efficient grinding is accomplished and furthermore grinding wheels can be used for many grindings before they must be reshaped. Such long lasting use of the grinding wheels results from the flatwise edge engagement of both beveled portions of the cutter element by the grinding wheel.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A grinding machine for sharpening saw chains having cutter links with cutter elements having beveled surfaces providing cutting edges on the forward portions of said cutter elements and with depth gauges positioned forwardly of said cutter elements with a space between the cutter element and depth gauge of each cutter link; comprising:

a machine base;

a rotatable grinding wheel having a peripheral edge shaped to grind said beveled surfaces to thereby sharpen said cutting edges;

means for supporting a saw chain on said base and for holding one of said cutter links in position for grinding said beveled portions of said cutter element of said one cutter link with said peripheral edge;

means for supporting said grinding wheel on said base and for rotatively driving said grinding wheel;

means for moving said grinding wheel and saw chain relative to each other to move said peripheral edge of said grinding wheel into said space of said one cutter link while maintaining said peripheral edge out of contact with said beveled surfaces of the cutter element of said one cutter link during such movement;

and means for thereafter moving said saw chain and grinding wheel relatively to each other generally longitudinally of said chain to move said beveled surfaces of the cutter element of said one cutter link into contact with said peripheral edge.

2. The saw chain grinding machine of claim 1 in which the means for supporting said grinding wheel on said base includes an arm carrying said grinding wheel and means mounting said arm for pivotal movement of said arm about an axis spaced from said grinding wheel to provide for moving said peripheral edge of said grinding wheel into said space and means for supporting the last named means on said base for adjustment of said pivotal axis about two axes at right angles to each other.

3. The saw chain grinding machine of claim 1 in which the means for supporting a saw chain on said base includes a carriage mounted on said base for movement generally longitudinally of the saw chain supported thereby to provide for advancing movement of said carriage to advance said beveled portions of the cutter element of said one cutter link into contact with said peripheral edge.

4. The saw chain grinding machine of claim 3 in which said carriage includes a bar extending in the direction of movement of said carriage and having a longitudinal groove therein for receiving a portion of said saw chain and hold down means for engaging said saw chain for anchoring said saw chain in said groove.

5. The saw chain grinding machine of claim 3 including pivoted latch means arranged to engage a trailing edge of said one cutter link to be ground for anchoring said one cutter link against retracting movement relative to the advancing movement of said carriage.

6. The saw chain grinding machine of claim 3 including anvil means arranged to engage a side of said one cutter link on a side opposite from a side of engagement of said grinding wheel to support said one cutter link laterally in a grinding operation.

7. The saw chain grinding machine of claim 3 wherein said bar has a longitudinal groove for receiving a portion of the saw chain, and including hold-down means arranged to engage a saw chain on said upright bar and hold the chain securely in said groove, pivotal latch means arranged to engage a trailing edge of said one cutter link for anchoring said one cutter link against retracting movement relative to the advancing movement of said carriage, and anvil means arranged to engage a side of said one cutter link on a side opposite from a side of engagement of said grinding wheel to support said one cutter link laterally in a grinding operation.

8. The saw chain grinding machine of claim 1 wherein said means for supporting said grinding wheel on said base comprises a turntable on said base having rotative adjustment relative to said base on a vertical axis, an arm having opposite ends one end of which is connected to said turntable in rotative adjustment on a horizontal axis as well as free swinging lateral movement, and means mounting said grinding wheel on the other end of said arm.

9. The saw chain grinding machine of claim 1 wherein said means for supporting said grinding wheel on said base comprises a turntable on said base having rotative adjustment relative to said base on a vertical axis, an arm having opposite ends one end of which is connected to said turntable in rotative adjustment on a horizontal axis as well as free swinging lateral movement, and rotative adjustment means mounting said grinding wheel on the other end of said arm for rotatively positioning the motor on said arm.

10. The chain saw grinding machine of claim 1 wherein said means for supporting said grinding wheel on said base supports said grinding wheel selectively such that said grinding wheel is directed obliquely relative to said bar and said carriage includes means pivotally connected to said base for moving the grinding wheel to a grinding position or a retracted position.

11. The saw chain grinding machine of claim 1 wherein said means supporting said grinding wheel is pivotally connected to said base for moving the grinding wheel to a forward grinding position or a retracted position, and including power operated hold-down means arranged to engage a saw chain on said bar and controlled in its operation to perform a hold-down engagement with the chain when said grinding wheel is in a grinding position.

12. The saw chain grinding machine of claim 3 including abutment means on said base for limiting the advancing movement of said carriage.

13. The saw chain grinding machine of claim 3 including adjustable abutment means on said base for limiting the advancing movement of said carriage.

14. The saw chain grinding machine of claim 3 including lever means interengaged between said base and said carriage for advancing the latter.

References Cited

UNITED STATES PATENTS

| | | | |
|---|---|---|---|
| 2,589,165 | 3/1952 | Toy et al. | 76—40 |
| 2,811,873 | 11/1957 | Nielsen | 76—40 |
| 2,811,874 | 11/1957 | Rethoret | 76—40 |
| 2,824,468 | 2/1958 | Nielsen | 76—40 |
| 3,006,222 | 10/1961 | McEwan | 76—40 |
| 3,071,026 | 1/1963 | De Witt | 76—40 |

GRANVILLE Y. CUSTER, Jr., *Primary Examiner.*